(12) United States Patent
Wang et al.

(10) Patent No.: US 11,530,156 B2
(45) Date of Patent: Dec. 20, 2022

(54) METHOD FOR PREPARING ALL-SOLID-STATE PHOTONIC CRYSTAL FIBER PREFORMS BY EXTRUSION

(71) Applicant: Ningbo University, Ningbo (CN)

(72) Inventors: Xunsi Wang, Ningbo (CN); Youren Dong, Ningbo (CN); Shixun Dai, Ningbo (CN); Qiuhua Nie, Ningbo (CN); Xiange Wang, Ningbo (CN); Minghui Zhong, Ningbo (CN); Rongping Wang, Ningbo (CN); Xiang Shen, Ningbo (CN); Zijun Liu, Ningbo (CN); Yongxing Liu, Ningbo (CN)

(73) Assignee: Ningbo University, Ningbo (CN)

( * ) Notice: Subject to any disclaimer, the term of this patent is extended or adjusted under 35 U.S.C. 154(b) by 421 days.

(21) Appl. No.: 16/863,652

(22) Filed: Apr. 30, 2020

(65) Prior Publication Data

US 2020/0354260 A1    Nov. 12, 2020

(30) Foreign Application Priority Data

May 6, 2019   (CN) .......................... 201910370331.7

(51) Int. Cl.
*C03B 37/012*   (2006.01)
*C03B 37/10*    (2006.01)
(Continued)

(52) U.S. Cl.
CPC ........ *C03B 37/01274* (2013.01); *C03B 37/10* (2013.01); *C03C 3/12* (2013.01); *C03C 3/23* (2013.01); *C03C 3/253* (2013.01); *C03C 3/321* (2013.01); *C03C 3/325* (2013.01); *C03B 2201/78* (2013.01); *C03B 2201/82* (2013.01); *C03B 2201/86* (2013.01); *C03B 2203/42* (2013.01)

(58) Field of Classification Search
None
See application file for complete search history.

(56) References Cited

U.S. PATENT DOCUMENTS

| | | | | |
|---|---|---|---|---|
| 4,504,298 A | * | 3/1985 | Yokota | ................... G02B 6/102 385/144 |
| 2006/0104582 A1 | * | 5/2006 | Frampton | ........... C03B 37/0122 385/125 |
| 2016/0245989 A1 | * | 8/2016 | Suzuki | ............... G02B 6/02009 |

FOREIGN PATENT DOCUMENTS

| | | | | |
|---|---|---|---|---|
| CN | 102531377 A | * | 7/2012 | ....... C03B 37/01274 |
| CN | 105923988 A | * | 9/2016 | ........... C03B 37/012 |
| CN | 106966571 A | * | 7/2017 | |

OTHER PUBLICATIONS

CN-105923988-A—Clarivate Analystics Translation Performed Aug. 18, 2022. (Year: 2022).*

(Continued)

*Primary Examiner* — Lisa L Herring
(74) *Attorney, Agent, or Firm* — Wang Law Firm, Inc.

(57) ABSTRACT

A method for preparing all-solid-state photonic crystal fiber preform by extrusion by aligning the center of the first jacking end of the first jacking rod with the center of the core outlet mold. The adverse effect on this part of extruded core glass by oxygen or other impurities in air during the extrusion out of the core outlets can be avoided. The defects on the core glass surface and the cladding glass surface can be effectively removed, and the purity and quality of the core component in the obtained fiber preform can be improved.

9 Claims, 7 Drawing Sheets

(51) Int. Cl.
  *C03C 3/32* (2006.01)
  *C03C 3/12* (2006.01)
  *C03C 3/253* (2006.01)
  *C03C 3/23* (2006.01)

(56) References Cited

OTHER PUBLICATIONS

CN-106966571-A EPO Machine Translation Performed Aug. 19, 2022. (Year: 2022).*
CN-102531377-A Clarivate Analystics Translation Performed Aug. 19, 2022. (Year: 2022).*
Barney et al., "Correlating structure with non-linear optical properties in xAs40Se60(1 x)As40S60 glasses", Phys. Chem. Chem. Phys., 2015, 17, pp. 6314-6327. (Year: 2015).*

* cited by examiner

METHOD FOR PREPARING ALL-SOLID-STATE PHOTONIC CRYSTAL FIBER PREFORMS BY EXTRUSION

RELATE APPLICATION

This application claims the priority benefit of China Application serial no. 201910370331.7, filed on May 6, 2019. The entirety of the above-mentioned application is incorporated here by this reference and made a part of this specification

TECHNICAL FIELD OF THE INVENTION

The present invention relates to the technical field of fiber preform, and in particular to a method for preparing all-solid-state photonic crystal fiber preform by extrusion.

BACKGROUND OF THE INVENTION

Compared with the traditional fibers, photonic crystal fibers (PCFs) or micro-structured fibers (MSFs) have many unique and novel physical properties such as controllable nonlinearity, endlessly single mode, manageable dispersion, low bending loss and large mode area, which are impossible for the conventional single mode fibers. Accordingly, PCFs have attracted worldwide attention. Meanwhile, the processes of manufacturing PCFs have made great progress.

According to different structures of PCFs, PCFs may be simply classified into two categories: air-filled PCFs and all-solid-state PCFs. Compared with the air-filled PCFs, all-solid-state PCFs have several advantages during the drawing process: less deformation of the fiber micro-structure, easy splicing with the traditional fibers, low thermal resistance, high pollution resistance, and easy preparation of all-fiber devices.

Infrared soft glass (for example, chalcogenide glass, heavy metal oxide glass, fluorozirconate glass, etc.) has drawn unprecedented worldwide attention in recent years due to its excellent properties such as low phonon energy, excellent infrared transmission property, and quite high linear and nonlinear refractive index. Moreover, infrared soft glass also has advantages of low transformation temperature, high chemical stability and thermal stability, good mechanical property, etc. Therefore, all-solid-state infrared-soft-glass-based PCFs may have broad application in far-infrared optics. However, there is only one method to prepare all-solid-state PCF preform, especially all-solid-state infrared-soft-glass-based PCF preform, i.e., stacking-capillary method. All-solid-state PCFs prepared by the stacking-capillary method are of no practical value due to their disadvantages of severe deformation, the presence of defects on the core-cladding interface, and high optical loss.

SUMMARY OF THE INVENTION

It is an object of the present invention to provide a method for preparing all-solid-state photonic crystal fiber preform by extrusion, in order to overcome the problems in the prior art. In the method for preparing all-solid-state photonic crystal fiber preform by extrusion, by an extrusion molding device, an array of neatly-arranged glass columns can be extruded from core glass in a specifically-designed core outlet mold at a temperature near the glass softening temperature, and then the array of glass columns and the cladding glass are co-extruded to obtain fiber preform. By the method for preparing all-solid-state photonic crystal fiber preform by extrusion, the deformation of the core array can be effectively controlled, the interface between the core glass and the cladding glass can be improved, the adverse effect on the core by oxygen or other impurities in air can be avoided, the quality of the core glass surface and the cladding glass surface of the obtained fiber preform can be improved, and the structural deformation of the fiber preform products in the subsequent process can be avoided.

For achieving the object, the method for preparing all-solid-state photonic crystal fiber preform by extrusion, comprising:

Step-1: preparing an extrusion container, an extrusion chamber, a core outlet mold, a first jacking rod having a first jacking end, a second jacking rod having a second jacking end, an extrusion head and a fiber preform outlet mold, wherein the extrusion container has an opening and a preform outlet respectively on the top and the bottom of the extrusion container; the extrusion chamber has a top opening and a bottom opening respectively on the top and the bottom of the extrusion chamber; the core outlet mold has a plurality of core outlets; the bottom opening of the extrusion chamber communicates with core outlets on the core outlet mold; the size of the top opening of the extrusion chamber is smaller than the diameter of the first jacking end of the first jacking rod, and the size of the top opening is greater than the diameter of the second jacking end of the second jacking rod;

Step-2: preparing a core glass ingot and a cladding glass ingot which are rinsed with alcohol and dried, wherein the core glass ingot has an outer diameter matched with the inner diameter of the extrusion chamber; and the cladding glass ingot has an outer diameter matched with the inner diameter of the extrusion container;

Step-3: placing the cladding glass ingot inside the bottom of the extrusion container, placing the core glass ingot and the extrusion head inside the extrusion chamber, and mounting the core outlet mold at the bottom of the extrusion chamber, the core outlet mold is located above the cladding glass ingot and the extrusion head is located on the core glass ingot;

Step-4: putting the extrusion chamber with the core glass ingot into the extrusion container, and resting the first jacking end of the first jacking rod against the top surface of the extrusion chamber, aligning the center of the first jacking end of the first jacking rod with the center of the core outlet mold;

Step-5: heating the extrusion container with the extrusion chamber of the Step-4 until the temperature in the extrusion container reaches a preset temperature T, so as to make the core glass ingot and the cladding glass ingot in the extrusion container soft to obtain softened core glass and cladding glass; wherein the preset temperature T is higher than Tg and lower than Tx; Tg is defined as the highest one of the core glass transition temperature and the cladding glass transition temperature, and Tx is defined as the lowest one of the core glass crystallization temperature and the cladding glass crystallization temperature;

Step-6: pressing the first jacking rod against the top of the extrusion chamber, and pushing the extrusion chamber into the cladding glass inside the extrusion container, so as to make the bottom of the core outlets of the core outlet mold flush with the bottom of the cladding glass or make the bottom of the core outlets of the core outlet mold lower than the bottom of the cladding glass;

Step-7: maintaining the temperature inside the extrusion container at the preset temperature T, taking the first jacking rod out of the extrusion container, and putting the second jacking rod into the extrusion container, in such a way that the second jacking end of the second jacking rod runs through the top opening of the extrusion chamber and resists against the extrusion head;

Step-8: making the second jacking rod push the extrusion head to press the core glass inside the extrusion chamber, so that the core glass is extruded out from the core outlets on the core outlet mold located on the bottom of the extrusion container, obtaining a core array having N cores;

Step-9: uniformly pressing the core glass in the extrusion chamber and the cladding glass in the extrusion container, so that the core glass and cladding glass are co-extruded out from the preform outlet on the extrusion container, obtaining an initial product of the fiber preform; and Step-10: annealing the obtained initial product of the fiber preform at the transition temperature Tg for a preset period of time, and cooling the initial product of the fiber preform to room temperature, then a fiber preform is obtained.

Preferably, in the method of claim 1, wherein a top plate is disposed in the extrusion chamber covering the core glass ingot; and the extrusion head has a plurality of extrusion stems corresponding to each core outlet on the core outlet mold and capable of inserting into the corresponding core outlet after passing through the top plate.

Preferably, in the method for preparing all-solid-state photonic crystal fiber preform by extrusion, the N core outlets on the core outlet mold are separated from each other at a fixed distance.

Preferably, in the method for preparing all-solid-state photonic crystal fiber preform by extrusion, the extrusion container, the extrusion chamber, the core outlet mold, the first jacking rod, the second jacking rod, the extrusion head, the core glass ingot and the cladding glass ingot are all ultrasonically cleaned and wiped with alcohol before used.

Preferably, in the method for preparing all-solid-state photonic crystal fiber preform by extrusion, the pressing process of the first jacking rod onto the extrusion chamber in the Step-6 and the second jacking rod onto the extrusion chamber in the Step-8 are done in a vacuum chamber.

Preferably, the following step is repectively done before the pressing process of the first jacking rod onto the extrusion chamber in the Step-6 and the pressing process of the second jacking rod onto the extrusion chamber to press the core glass in the Step-8: the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure.

Preferably, in the method for preparing all-solid-state photonic crystal fiber preform by extrusion, in the Step-9, both the core glass in the extrusion chamber and the cladding glass in the extrusion container are extruded at a constant speed.

Preferably, in the method for preparing all-solid-state photonic crystal fiber preform by extrusion, the preset period of time in the Step-10 is between 4 h and 6 h.

Preferably, in the method for preparing all-solid-state photonic crystal fiber preform by extrusion, both the core glass ingot and the cladding glass ingot are infrared soft glass ingot, and the difference ΔTg between the transition temperatures for the core glass ingot and the cladding glass ingot is less than or equal to 15° C.

Preferably, in the method for preparing all-solid-state photonic crystal fiber preform by extrusion, the opening of the extrusion container, the top opening of the extrusion chamber, the center of the core outlet mold, and the preform outlet on the extrusion container are all located on a same line.

Compared with the prior art, the present invention has the following beneficial effects.

Firstly, in the method for preparing all-solid-state photonic crystal fiber preform by extrusion provided in the present invention, by applying a stress, a core array having N cores is formed in the core outlet mold from core glass inside the extrusion chamber (a regular core array may be obtained by using a core outlet mold having N core outlets regularly distributed), and then the core array and the cladding glass are co-extruded from the preform outlet to obtain all-solid-state photonic crystal fiber preform having a desired core array distribution.

By applying a stress, a desired core array distribution (for example, a regular core array distribution) is obtained from core glass ingot. That is, the softened core glass is extruded by resisting the second jacking rod against the extrusion head in the extrusion chamber, so that part of core glass, which is extruded by the second jacking rod, is forced through the softened cladding glass and extruded out of the core outlets on the core outlet mold. In this way, an array of core glass columns having a desired core array distribution (that is, having several cores, for example a regular core array distribution) is formed, and also, adverse effect on the extruded array of core glass columns by oxygen or other impurities in air during the extrusion from the preform outlet on the extrusion container is avoided. Thus, the defects on the core glass surface and the cladding glass surface can be effectively removed, and the purity and quality of the core component in the obtained fiber preform can be improved.

Secondly, in the method for preparing all-solid-state photonic crystal fiber preform by extrusion provided in the present invention, by extruding the core glass ingot and the cladding glass ingot in stages, the obtained fiber preform products have a more stable core-cladding ratio, the core and the cladding are fitted more closely, and the core-cladding interface is more clear and complete.

Thirdly, the method for preparing all-solid-state photonic crystal fiber preform by extrusion provided in the present invention is more controllable, so that the purity of the core component can be ensured, and the easy oxidation of the core during the preparation process using the traditional stacking-capillary method can be effectively avoided.

By the method for preparing all-solid-state photonic crystal fiber preform by extrusion provided in the present invention, the presence of defects on the core-cladding interface and high optical transmission loss in the obtained fiber preform prepared using the traditional stacking-capillary method are avoided.

Additionally, by the method for preparing all-solid-state photonic crystal fiber preform by extrusion provided in the present invention, the form of the core array can be accordingly adjusted by adjusting the distribution of the core outlets on the core outlet mold. Thus, all-solid-state photonic crystal fiber preform products having a desired core distribution can be obtained.

By using glass components that meet optically and thermally compatible requirements, all-solid-state photonic crystal fiber preform having different properties can be obtained (for example, all-solid-state infrared-soft-glass-based photonic crystal fiber preform having different properties can be obtained).

Additionally, in the method for preparing all-solid-state photonic crystal fiber preform by extrusion provided in the present invention, there is a top plate in the extrusion chamber, which covers an upper surface of the core glass ingot; and the extrusion head has extrusion stems that are arranged correspondingly to the core outlets on the core outlet mold and can run into the corresponding core outlets after passing through the top plate. That is, for each core outlet on the core outlet mold, there is a corresponding extrusion stem corresponding to this core outlet. During the extrusion, the extrusion head is pushed by the second jacking rod, each extrusion stem on the extrusion head extrudes the corresponding core glass ingot below this extrusion stem after passing through the top plate, and those core glass ingot beside this extrusion stem are not extruded toward the core outlets. In this way, the core glass ingot, which are extruded into the core outlets by the extrusion stem, are protected from adverse effect caused by coming into contact with the extrusion chamber or the sidewall of the core outlet mold. The adverse effect on this part of extruded core glass by oxygen or other impurities in air during the extrusion out of the core outlets can be avoided. The defects on the core glass surface and the cladding glass surface can be effectively removed, and the purity and quality of the core component in the obtained fiber preform can be improved. With the arrangement of the top plate, it is ensured that each extrusion stem can extrude the corresponding core glass ingot independently. This prevents the uprush of the softened core glass ingot toward the upper surface of the core glass ingot when being extruded downward by the extrusion stem. Thus, the quality of the core glass extruded into the corresponding core outlets is improved.

Finally, by changing the cross-sectional shape of the preform outlet on the fiber preform outlet mold, all-solid-state photonic crystal fiber preform products having different cross-sectional shapes can be obtained correspondingly.

DETAILED DESCRIPTION OF THE INVENTION

To enable a further understanding of the present invention content of the invention herein, refer to the detailed description of the invention and the accompanying drawings below:

Embodiment 1

Figure 1:
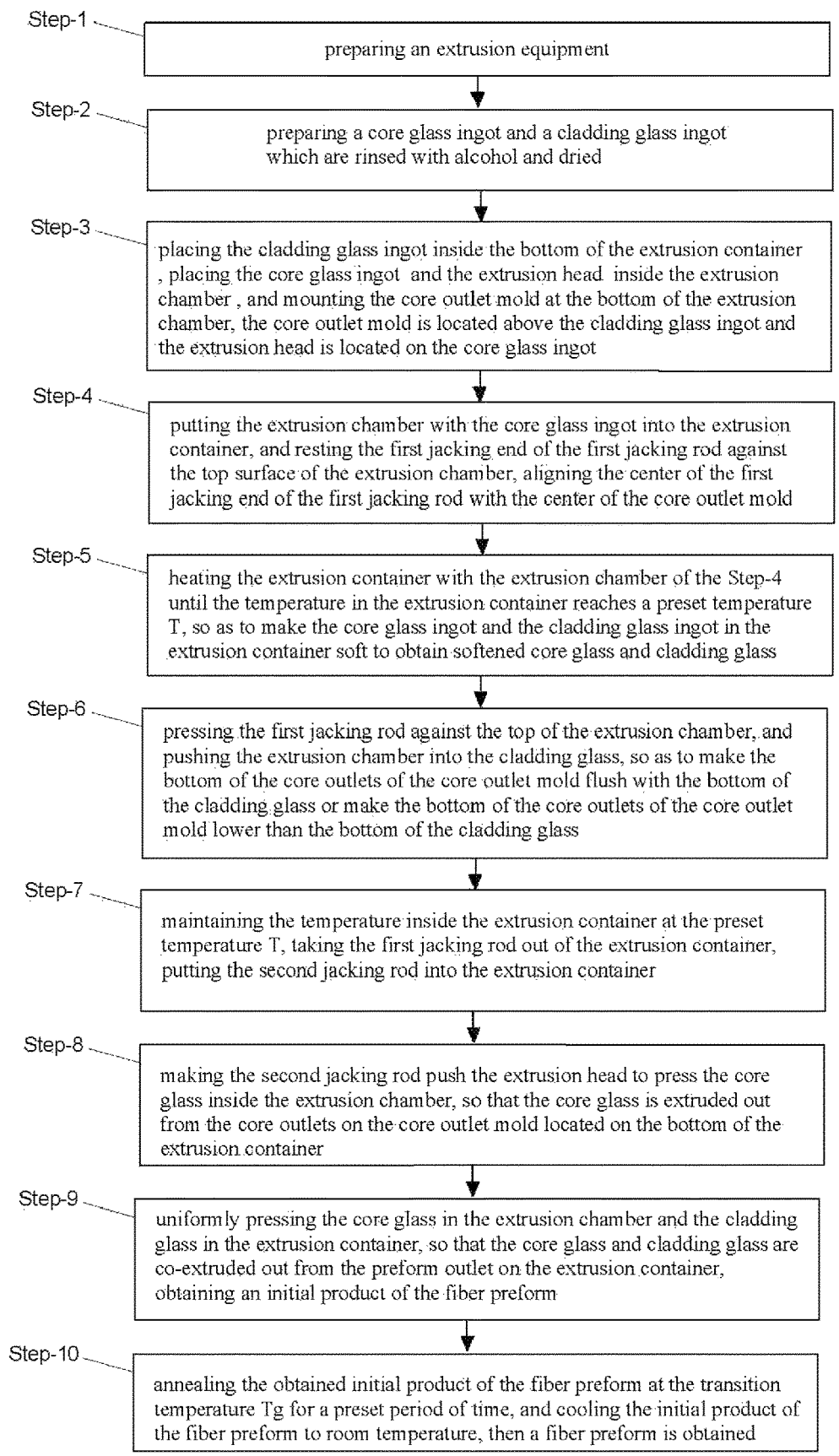
FIG. 1 is a schematic flowchart of a method for preparing all-solid-state photonic crystal fiber preform by extrusion, according to Embodiment 1 of the present invention.

In the Embodiment 1, it is set that the all-solid-state photonic crystal fiber preform to be prepared are chalcogenide photonic crystal fiber preform, and both the core glass ingot 5 and the cladding glass ingot 7 to be used are chalcogenide glass ingot. Specifically, the core glass ingot 5 are $As_2Se_3$ and the cladding glass ingot 7 are $As_2S_3$. As shown in FIG. 1, the method for preparing all-solid-state photonic crystal fiber preform by extrusion in this embodiment comprises following steps 1-10.

Figure 9:
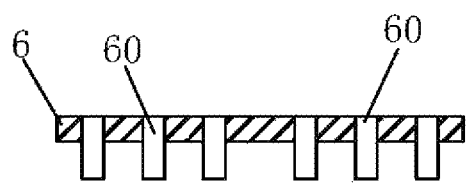
FIG. 9 is a sectional view of the core outlet mold, according to Embodiment 1.

Step-1: preparing an extrusion equipment, which includes an extrusion container 1, an extrusion chamber 2, an extrusion head 4, a core outlet mold 6, a fiber preform outlet mold 8, a first jacking rod 3 and a second jacking rod 12.

Wherein the extrusion container 1 has an opening and a preform outlet 10 respectively on the top and the bottom of the extrusion container 1; the extrusion chamber 2 has a top opening 9 and a bottom opening respectively on the top and the bottom of the extrusion chamber 2, and the bottom opening of the extrusion chamber 2 communicates with core outlets 60 on the core outlet mold 6. The size of the top opening 9 of the extrusion chamber 2 is smaller than the diameter of the first jacking end of the first jacking rod 3, to ensure that the first jacking end of the first jacking rod can run into the extrusion chamber 2 from the top opening. The size of the top opening 9 is greater than the diameter of the second jacking end of the second jacking rod 12. Herein, the core outlet mold 6 has N core outlets 60, N≥2. In this embodiment, the top opening of the extrusion chamber 2 is preferably circular, and similarly, the core outlets 60 on the core outlet mold 6 are also preferably circular. The N core outlets 60 in this embodiment are distributed regularly, that is, they form a regular array of core outlets. The core outlet mold 6 is shown in FIG. 9.

The extrusion container, the extrusion chamber, the outlet molds, the first jacking rod, the second jacking rod and the extrusion head, which are prepared in the Step-1, are all ultrasonically cleaned and wiped with alcohol before use. Due to the design that the size of the top opening is greater than the diameter of the first jacking end of the first jacking rod, it can be ensured that the first jacking end of the first jacking rod is always located on the outer side of the top of the extrusion chamber when the top of the extrusion chamber is extruded by the first jacking end of the first jacking rod, in order to ensure that the whole extrusion chamber is extruded downward by the first jacking end of the first jacking rod. Correspondingly, due to the design that the size of the top opening of the extrusion chamber is greater than the diameter of the second jacking end of the second jacking rod, it can be ensured that the second jacking end of the second jacking rod can run into the extrusion chamber from the top opening of the extrusion chamber during the subsequent extrusion process, to facilitate the extrusion of the corresponding $As_2Se_3$ chalcogenide core glass ingot by the extrusion head. Of course, when the extrusion container, the extrusion chamber, the first jacking rod, the second jacking rod and the extrusion head are ultrasonically cleaned and wiped with alcohol, they may be further cleaned with distilled water or deionized water.

Step-2: $As_2Se_3$ chalcogenide core glass ingot and $As_2S_3$ chalcogenide cladding glass ingot which are rinsed with alcohol and dried, wherein the $As_2Se_3$ chalcogenide core glass ingot has an outer diameter matched with the inner diameter of the extrusion chamber; and the $As_2S_3$ chalcogenide cladding glass ingot has an outer diameter matched with the inner diameter of the extrusion container.

Additionally, in the Step-2, the $As_2Se_3$ chalcogenide core glass ingot and the $As_2S_3$ chalcogenide cladding glass ingot are all ultrasonically cleaned and wiped with alcohol before used, to remove impurities on the surfaces of the two kinds of chalcogenide glass ingot, in order to avoid adverse effect on the subsequent preparation of fiber preform by extrusion by those impurities. Of course, when the two kinds of glass ingot are ultrasonically cleaned and wiped with alcohol, they may be further cleaned with distilled water or deionized water.

Here, the expression "the $As_2Se_3$ chalcogenide core glass ingot and $As_2S_3$ chalcogenide cladding glass ingot have an outer diameter matched with the inner diameter of the extrusion chamber" means that the $As_2Se_3$ chalcogenide core glass ingot, as the raw material, can be exactly placed in the extrusion chamber, and the $As_2S_3$ chalcogenide cladding glass ingot can be closely fitted on the inner sidewall of the extrusion chamber.

Step-3: Placing the $As_2S_3$ chalcogenide cladding glass ingot inside the bottom of the extrusion container 1, placing the $As_2Se_3$ chalcogenide core glass ingot and the extrusion head 4 inside the extrusion chamber 2, and mounting the core outlet mold 6 at the bottom of the extrusion chamber 2, the core outlet mold 6 is located above the $As_2S_3$ chalcogenide cladding glass ingot and the extrusion head 4 is located on the core glass ingot are assembled in such a way that the core outlet mold 6 is located above the $As_2S_3$ chalcogenide cladding glass ingot. The extrusion head 4 is located above the $As_2Se_3$ chalcogenide core glass ingot. The extrusion chamber 2 can protect the $As_2Se_3$ chalcogenide core glass ingot, to ensure that the $As_2Se_3$ chalcogenide core glass ingot can be wholly extruded into the $As_2S_3$ chalcogenide cladding glass ingot.

Step-4: Putting the extrusion chamber 2 with the $As_2Se_3$ chalcogenide core glass ingot into the extrusion container 1, and resting the first jacking end of the first jacking rod 3 against the top surface of the extrusion chamber, aligning the center of the first jacking end of the first jacking rod 3 with the center of the core outlet mold 6.

Figure 2:
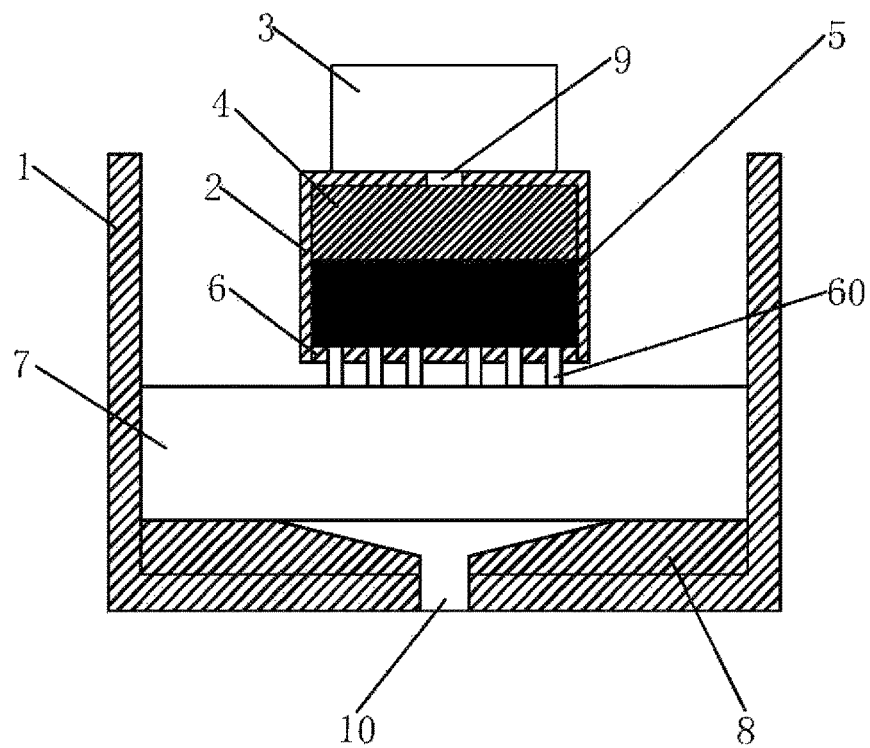
FIG. 2 is a sectional view of the extrusion equipment before the first jacking rod starts extruding, according to Embodiment 1.

Step-5: Heating the extrusion container 1 with the extrusion chamber of the step 4 until the temperature in the extrusion container 1 reaches a preset temperature T, so as to make the $As_2Se_3$ chalcogenide core glass ingot and the $As_2S_3$ chalcogenide cladding glass ingot in the extrusion container 1 soft to obtain softened $As_2Se_3$ chalcogenide core glass and $As_2S_3$ chalcogenide cladding glass.

Wherein the preset temperature T is higher than Tg and lower than Tx; Tg is defined as the highest one of the $As_2Se_3$ chalcogenide core glass transition temperature and the $As_2S_3$ chalcogenide cladding glass transition temperature, and the Tx is defined as the lowest one of the $As_2Se_3$ chalcogenide core glass crystallization temperature and the $As_2S_3$ chalcogenide cladding glass crystallization temperature. For example, according to the $As_2Se_3$ chalcogenide core glass ingot and the $As_2S_3$ chalcogenide cladding glass ingot to be used, the preset temperature T in this embodiment is higher than 185° C. and lower than 370° C. For example, the preset temperature T is 200° C. The state before the extrusion of the extrusion chamber 2 by the first jacking rod 3 starts is shown in FIG. 2.

Step-6: Pressing the first jacking rod 3 against the top of the extrusion chamber 2, and pushing the extrusion chamber 2 into the $As_2S_3$ chalcogenide cladding glass inside the extrusion container 1, so as to make the bottom of the core outlets 60 of the core outlet mold 6 flush with the bottom of the $As_2S_3$ chalcogenide cladding glass or make the bottom of the core outlets 60 on the core outlet mold 6 is lower than the bottom of the $As_2S_3$ chalcogenide cladding glass. The application of the pressing process of the first jacking rod 3 onto the extrusion chamber 2 is in a vacuum chamber. That is, the extrusion chamber 2, the extrusion container 1 and the first jacking rod 3 are all put in the vacuum chamber for extrusion.

Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

Figure 3:
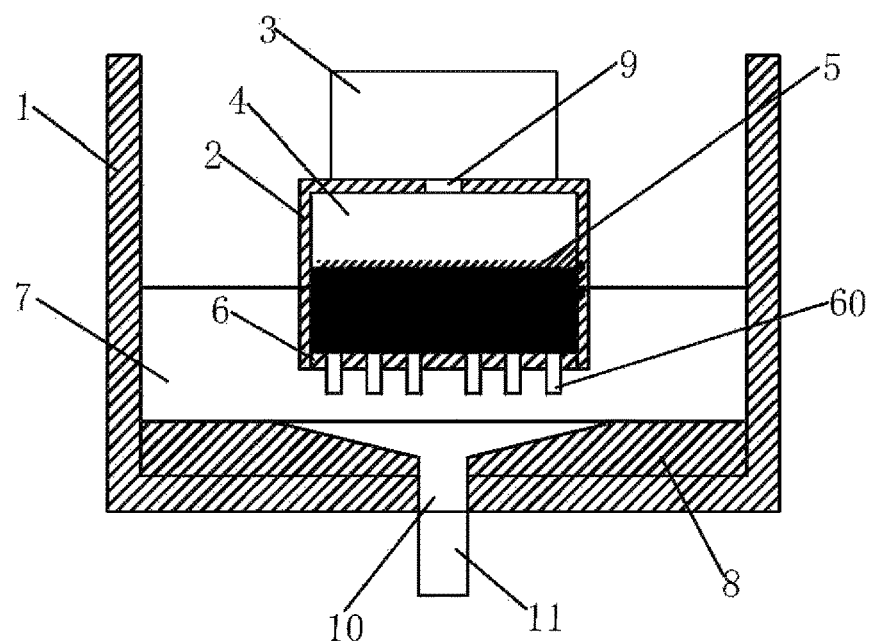
FIG. 3 is a sectional view of the extrusion equipment when the first jacking rod finishes extruding, according to Embodiment 1.

During the extrusion of the top of the extrusion chamber 2 by the first jacking rod 3, the opening of the extrusion container 1, the top opening 9 of the extrusion chamber 2, the center of the core outlet mold 6, and the preform outlet 10 on the extrusion container 1 are all located on a same line. This ensures that the fiber preform products prepared by extrusion will not bend. The state when the extrusion of the extrusion chamber 2 by the first jacking rod 3 ends is shown in FIG. 3 in which the reference numeral 11 now presents the part of $As_2S_3$ chalcogenide cladding glass ingot extruded from the preform outlet 10.

Figure 4:
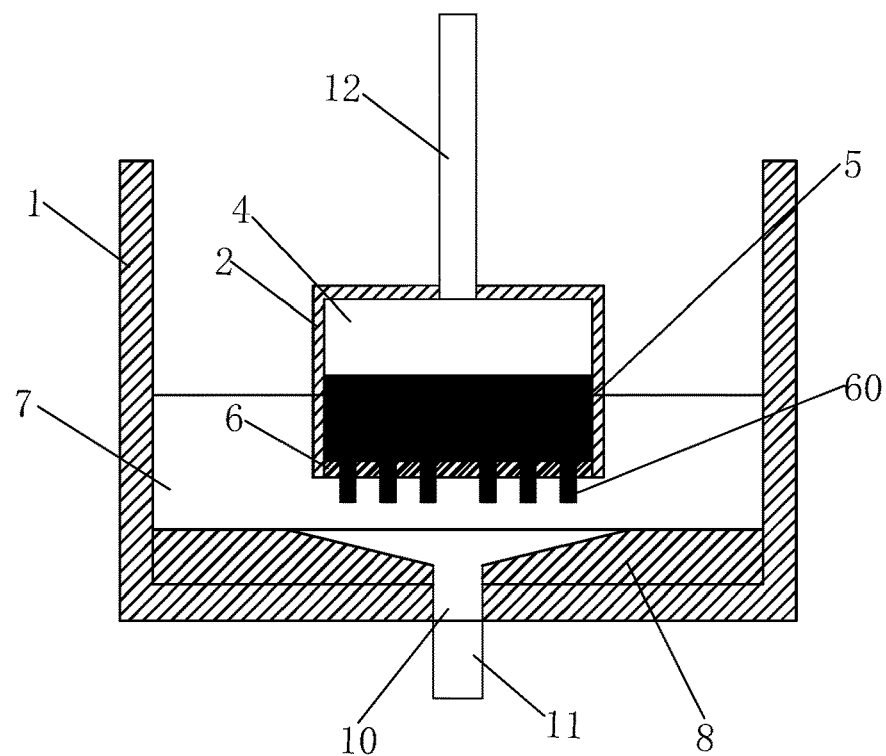
FIG. 4 is a sectional view of the extrusion equipment during the second jacking rod extrudes, according to Embodiment 1.

Step-7: Maintaining the temperature inside the extrusion container 1 at the preset temperature T, taking the first jacking rod 3 out of the extrusion container 1 and putting the second jacking rod 12 into the extrusion container 1, in such a way that the second jacking end of the second jacking rod 12 runs through the top opening 9 of the extrusion chamber 2 and resists against the extrusion head 4. The state when the extrusion chamber 2 is extruded by the second jacking rod 12 is shown in FIG. 4. The second jacking end of the second jacking rod 12 is preferably resisted against the upper surface of the extrusion head 4, so that the extrusion head 4 fully extrudes the $As_2Se_3$ chalcogenide core glass ingot below the extrusion head.

Figure 5:
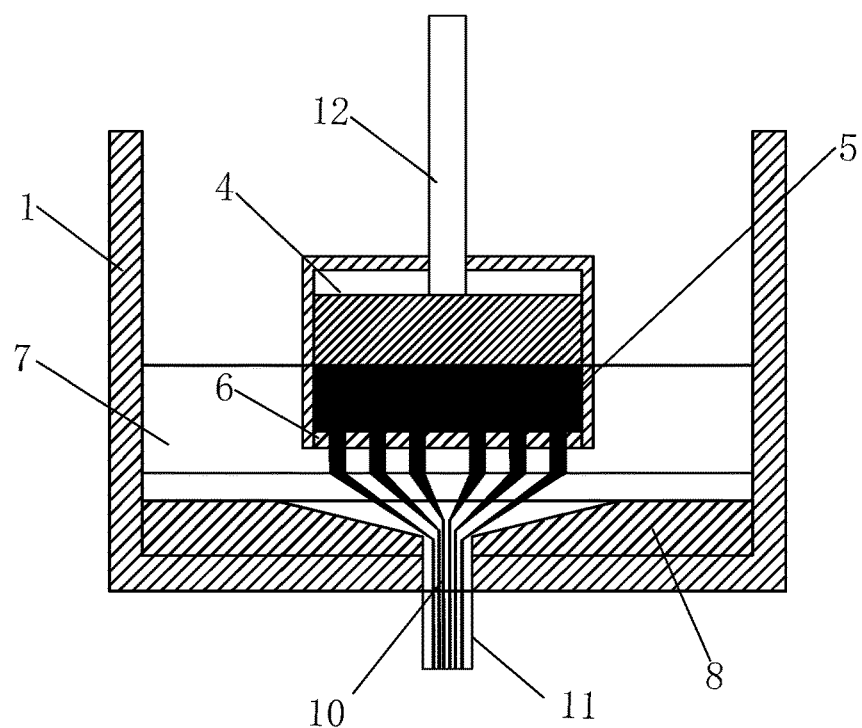
FIG. 5 is a sectional view of the extrusion equipment when the when the second jacking rod finishes extruding, according to Embodiment 1.

Step-8: Making the second jacking rod 12 push the extrusion head 4 to press the $As_2Se_3$ chalcogenide core glass inside the extrusion chamber 2, so that the $As_2Se_3$ chalcogenide core glass is extruded out from the core outlets 60 on the core outlet mold 6 located on the bottom of the extrusion container, obtaining a core array having N $As_2Se_3$ chalcogenide cores. The state when the extrusion of the extrusion chamber 2 by the second jacking rod 12 ends is shown in FIG. 5 in which the upper half of the reference numeral 11 now presents initial preform products containing a $As_2Se_3$ chalcogenide core glass array. Then, the core glass in the extrusion chamber 2 and the cladding glass in the extrusion container 1 are co-extruded to form preform having a regular core array. In this embodiment, the extrusion head 4 can be fully resisted against the whole upper surface of the $As_2Se_3$ chalcogenide core glass in the extrusion chamber.

Step-9: Uniformly pressing the core glass in the extrusion chamber 2 and the cladding glass in the extrusion container 1, so that the $As_2Se_3$ chalcogenide core glass and the $As_2S_3$ chalcogenide cladding glass are co-extruded out from the preform outlet 10 on the extrusion container 1 obtaining an initial product of the fiber preform.

In the Step-9, both the $As_2Se_3$ chalcogenide core glass in the extrusion chamber 2 and the $As_2S_3$ chalcogenide cladding glass in the extrusion container 1 are extruded at a constant speed. Thus, the uniformity of purity of the obtained initial products of the fiber preform and the finally obtained fiber preform products can be improved, and the fracture of the obtained initial products of the fiber preform and the finally obtained fiber preform products due to inconstant speed can be avoided. Therefore, the quality of the prepared fiber preform products is improved.

The application of a stress onto the top of the extrusion chamber 2 by the second jacking rod 12 is also done in a vacuum chamber. That is, the extrusion chamber 2, the extrusion container 1 and the second jacking rod 12 are all put in the vacuum chamber for extrusion. Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

Step-10: Annealing the obtained initial product of the fiber preform at the transition temperature Tg for a preset period of time (here, 4 h), and cooling the initial product of the fiber preform to room temperature, then a fiber preform is obtained.

Figure 6:
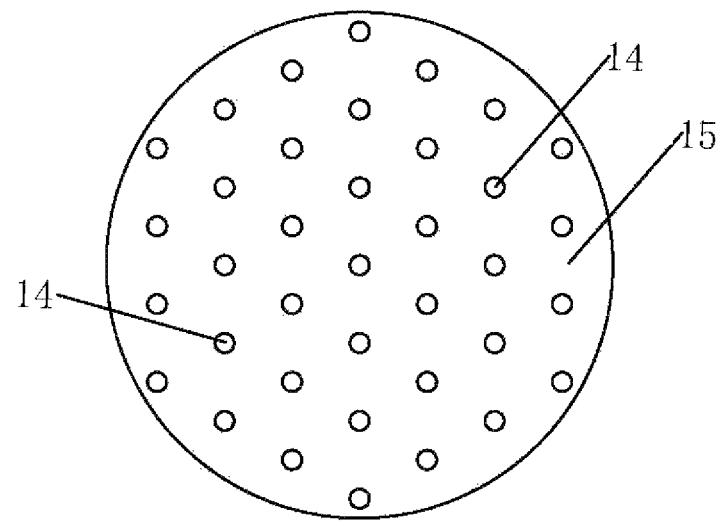
FIG. 6 is a cross-sectional view of fiber preform product prepared by extrusion, according to Embodiment 1 of the present invention.

The cross-section of the fiber preform products prepared in Embodiment 1 is shown in FIG. 6. The reference numeral 14 in FIG. 6 represents the $As_2Se_3$ core glass for the obtained all-solid-state chalcogenide photonic crystal fiber preform products, and the reference numeral 15 represents the $As_2S_3$ cladding glass for the obtained all-solid-state chalcogenide photonic crystal fiber preform products.

It can be found from the product structure shown in FIG. 6 that, in the obtained all-solid-state chalcogenide photonic crystal fiber preform products, the core array of the fiber preform is clear and regular and is closely fitted with the cladding, the core-cladding interface is clear and complete, and the defects on the core-cladding interface, which exist in the preform prepared by the stacking-capillary method, are avoided. Therefore, in this embodiment, the prepared fiber preform are highly precise in size.

Figure 10:
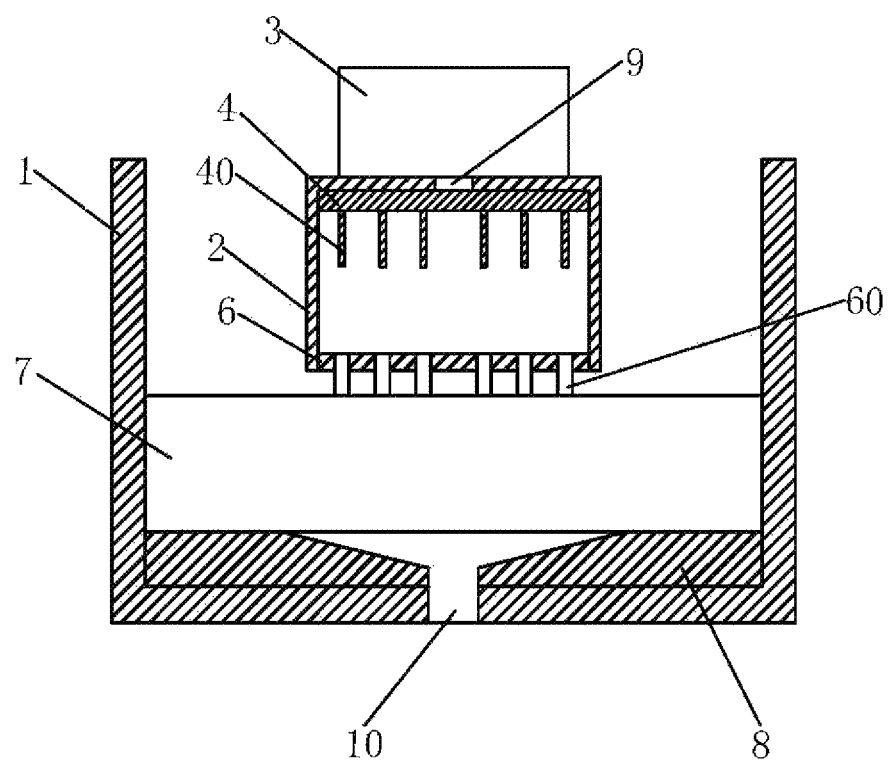
FIG. 10 is a sectional view of the extrusion equipment before an extrusion operation (no core glass ingot is placed in the extrusion chamber) is performed by using an extrusion head having multiple extrusion stems, according to Embodiment 1.
Figure 11:
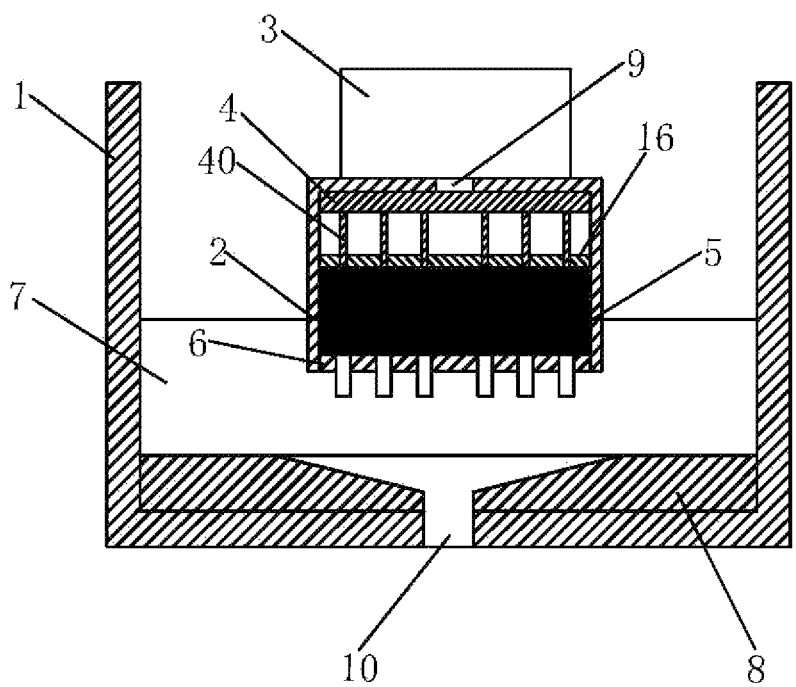
FIG. 11 is a sectional view of the extrusion equipment at the beginning of the extrusion operation (core glass ingot is placed in the extrusion chamber) by using an extrusion head having multiple extrusion stems, according to Embodiment 1.
Figure 12:
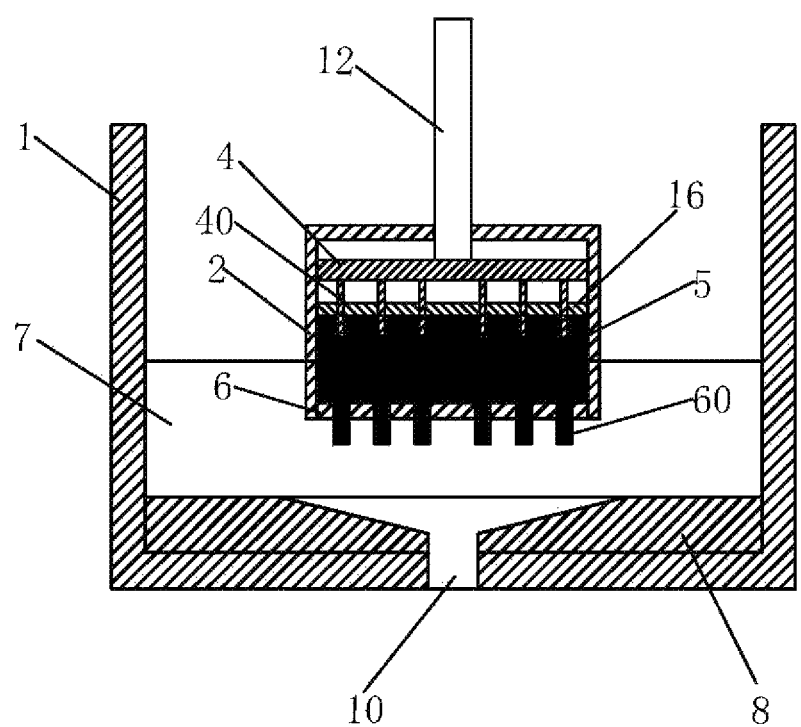
FIG. 12 is a sectional view of the extrusion equipment during the extrusion operation (core glass ingot is placed in the extrusion chamber) by using an extrusion head having multiple extrusion stems, according to Embodiment 1.

Of course, a top plate 16 is disposed in the extrusion chamber 2 covering the core glass ingot 5; and the extrusion head 4 has a plurality of extrusion stems 40 corresponding to each core outlet 60 on the core outlet mold 6 and capable of inserting into the corresponding core outlet 60 after passing through the top plate 16. As shown in FIG. 10 (no $As_2Se_3$ chalcogenide core glass ingot are placed in the extrusion chamber), for each core outlet 60 on the core outlet mold, there is a corresponding extrusion stem corresponding to this core outlet 60. As shown in FIG. 11 ($As_2Se_3$ chalcogenide core glass ingot are placed in the extrusion chamber) and FIG. 12, when the core glass ingot are placed in the extrusion chamber and extruded according to the preparation method described in this embodiment, in the step 8, the extrusion head 4 is pushed by the second jacking rod 12, each extrusion stem 40 on the extrusion head 4 downward extrudes the corresponding core glass ingot below this extrusion stem, and those core glass ingot beside this extrusion stem are not extruded toward the core outlets 60. In this way, the core glass ingot, which are extruded into the core outlets 60 by the extrusion stem, are protected from adverse effect caused by coming into contact with the extrusion chamber or the sidewall of the core outlet mold 6. The adverse effect on this part of extruded core glass by oxygen or other impurities in air during the extrusion out of the core outlets 60 can be avoided. The defects on the core glass surface and the cladding glass surface can be effectively removed, and the purity and quality of the core component in the obtained fiber preform can be improved. With the arrangement of the top plate 16, it is ensured that each extrusion stem can extrude the corresponding core glass ingot independently. This prevents the uprush of the softened core glass ingot toward the upper surface of the core glass ingot when being extruded downward by the extrusion stem. Thus, the quality of the core glass extruded into the corresponding core outlets 60 is improved.

To prepare fiber preform of different requirements, as an improvement to this embodiment, the core glass outlet mold connected to the bottom of the extrusion chamber may be designed to be adjustable according to the actual requirements. That is, by changing the cross-sectional shape of the preform outlet on the fiber preform outlet mold 8, all-solid-state infrared-soft-glass-based photonic crystal fiber preform products having different cross-sectional shapes can be obtained correspondingly.

Embodiment 2

In the Embodiment 2, it is set that the all-solid-state photonic crystal fiber preform to be prepared are heavy metal oxide glass based photonic crystal fiber preform, and both the core glass ingot 5 and the cladding glass ingot 7 to be used are heavy metal oxide glass ingot. Specifically, the core glass ingot 5 are $TeO_2$—$Nb_2O_5$—PbO and the cladding glass ingot 7 are $TeO_2$—$GeO_2$—$Nb_2O_5$. As shown in FIGS. 1-5, the method for preparing all-solid-state photonic crystal fiber preform by extrusion in this embodiment comprises following steps 1-10.

Step-1: An extrusion container 1, an extrusion chamber 2, an extrusion head 4, a core outlet mold 6 (the structure of which may be different from that in Embodiment 1), a fiber preform outlet mold 8 (the structure of which may be different from that in Embodiment 1), a first jacking rod 3 and a second jacking rod 12 are prepared in advance. The extrusion container 1 has an opening and a preform outlet 10 respectively on the top and the bottom of the extrusion container 1; the extrusion chamber 2 has a top opening 9 and a bottom opening respectively on the top and the bottom of the extrusion chamber 2 and a the bottom opening of the extrusion chamber 2 communicates with core outlets 60 on the core outlet mold 6. The size of the top opening 9 of the extrusion chamber 2 is smaller than the diameter of the first jacking end of the first jacking rod 3, and the size of the top opening 9 is greater than the diameter of the second jacking end of the second jacking rod 12. Herein, the core outlet mold 6 has N core outlets 60, where N≥2. In this embodiment, the top opening of the extrusion chamber 2 is preferably circular, and similarly, the core outlets 60 on the core outlet mold 6 are also preferably circular. The N core outlets

60 in this embodiment are distributed regularly, that is, they form a regular array of core outlets. The core outlet mold 6 is shown in FIG. 9.

The extrusion container, the extrusion chamber, the outlet molds, the first jacking rod, the second jacking rod and the extrusion head, which are prepared in the step 1, are all ultrasonically cleaned and wiped with alcohol before use. Due to the design that the size of the top opening of the extrusion chamber is smaller than the diameter of the first jacking end of the first jacking rod, it can be ensured that the first jacking end of the first jacking rod is always located on the outer side of the top of the extrusion chamber when the top of the extrusion chamber is extruded by the first jacking end of the first jacking rod, in order to ensure that the whole extrusion chamber is extruded downward by the first jacking end of the first jacking rod. Correspondingly, due to the design that the size of the top opening of the extrusion chamber is greater than the diameter of the second jacking end of the second jacking rod, it can be ensured that the second jacking end of the second jacking rod can run into the extrusion chamber from the top opening of the extrusion chamber during the subsequent extrusion process, to facilitate the extrusion of the corresponding $TeO_2$—$Nb_2O_5$—$PbO$ core glass ingot by the extrusion head. Of course, when the extrusion container, the extrusion chamber, the first jacking rod and the second jacking rod are ultrasonically cleaned and wiped with alcohol, they may be further cleaned with distilled water or deionized water.

Step-2: $TeO_2$—$Nb_2O_5$—$PbO$ core glass ingot and $TeO_2$—$GeO_2$—$Nb_2O_5$ cladding glass ingot which are rinsed with alcohol and dried, wherein the $TeO_2$—$Nb_2O_5$—$PbO$ core glass ingot has an outer diameter matched with the inner diameter of the extrusion chamber; and the $TeO_2$—$GeO_2$—$Nb_2O_5$ cladding glass ingot has an outer diameter matched with the inner diameter of the extrusion container.

Additionally, in the Step-2, the TeO2-Nb2O5-PbO core glass ingot and the $TeO_2$—$GeO_2$—$Nb_2O_5$ cladding glass ingot are all ultrasonically cleaned and wiped with alcohol before used, to remove impurities on the surfaces of the two kinds of heavy metal oxide glass ingot, in order to avoid adverse effect on the subsequent preparation of fiber preform by extrusion by those impurities. Of course, when the two kinds of glass ingot are ultrasonically cleaned and wiped with alcohol, they may be further cleaned with distilled water or deionized water.

Here, the expression "the TeO2-$Nb_2O_5$-PbO core glass ingot and $TeO_2$—$GeO_2$—$Nb_2O_5$ cladding glass ingot have an outer diameter matched with the inner diameter of the extrusion chamber" means that the TeO2-$Nb_2O_5$-PbO core glass ingot, as the raw material, can be exactly placed in the extrusion chamber, and the $TeO_2$—$GeO_2$—$Nb_2O_5$ cladding glass ingot can be closely fitted on the inner sidewall of the extrusion chamber.

Step-3: Placing the $TeO_2$—$GeO_2$—$Nb_2O_5$ cladding glass ingot inside the bottom of the extrusion container 1, placing the $TeO_2$—$Nb_2O_5$—$PbO$ core glass ingot and the extrusion head 4 inside the extrusion chamber 2, and mounting the core outlet mold 6 at the bottom of the extrusion chamber 2, the core outlet mold 6 is located above the $TeO_2$—$GeO_2$—$Nb_2O_5$ cladding glass ingot and the extrusion head 4 is located on the $TeO_2$—$Nb_2O_5$—$PbO$ core glass ingot are assembled in such a way that the core outlet mold 6 is located above the $TeO_2$—$Nb_2O_5$—$PbO$ cladding glass ingot. The extrusion head 4 is located above the $TeO_2$—$Nb_2O_5$—$PbO$ core glass ingot. The extrusion chamber 2 can protect the $TeO_2$—$Nb_2O_5$—$PbO$ core glass ingot, to ensure that the $TeO_2$—$Nb_2O_5$—$PbO$ core glass ingot can be wholly extruded into the $TeO_2$—$GeO_2$—$Nb_2O_5$ cladding glass ingot.

Step-4: Putting the extrusion chamber 2 with the $TeO_2$—$Nb_2O_5$—$PbO$ core glass ingot into the extrusion container 1, and resting the first jacking end of the first jacking rod 3 against the top surface of the extrusion chamber, aligning the center of the first jacking end of the first jacking rod 3 with the center of the core outlet mold 6

Step-5: Heating the extrusion container 1 with the extrusion chamber of the step 4 until the temperature in the extrusion container 1 reaches a preset temperature T, so as to make the $TeO_2$—$Nb_2O_5$—$PbO$ core glass ingot and the $TeO_2$—$GeO_2$—$Nb_2O_5$ cladding glass ingot in the extrusion container 1 soft to obtain softened $TeO_2$—$Nb_2O_5$—$PbO$ core glass and $TeO_2$—$GeO_2$—$Nb_2O_5$ cladding glass.

Wherein the preset temperature T is higher than Tg and lower than Tx; Tg is defined as the highest one of the $TeO_2$—$Nb_2O_5$—$PbO$ core glass transition temperature and the $TeO_2$—$GeO_2$—$Nb_2O_5$ cladding glass transition temperature, and the Tx is defined as the lowest one of the $TeO_2$—$Nb_2O_5$—$PbO$ core glass crystallization temperature and the $TeO_2$—$GeO_2$—$Nb_2O_5$ cladding glass crystallization temperature. For example, according to the $TeO_2$—$Nb_2O_5$—$PbO$ core glass ingot and the $TeO_2$—$GeO_2$—$Nb_2O_5$ cladding glass ingot to be used, the preset temperature T in this embodiment is higher than 185° C. and lower than 370° C. For example, the preset temperature T is 200° C. The state before the extrusion of the extrusion chamber 2 by the first jacking rod 3 starts is shown in FIG. 2.

Step-6: Pressing the first jacking rod 3 against the top of the extrusion chamber 2, and pushing the extrusion chamber 2 into the $TeO_2$—$GeO_2$—$Nb_2O_5$ cladding glass inside the extrusion container 1, so as to make the bottom of the core outlets 60 of the core outlet mold 6 flush with the bottom of the $TeO_2$—$GeO_2$—$Nb_2O_5$ cladding glass or make the bottom of the core outlets 60 on the core outlet mold 6 is lower than the bottom of the $TeO_2$—$GeO_2$—$Nb_2O_5$ cladding glass. The application of the pressing process of the first jacking rod 3 onto the extrusion chamber 2 is in a vacuum chamber. That is, the extrusion chamber 2, the extrusion container 1 and the first jacking rod 3 are all put in the vacuum chamber for extrusion.

Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

During the extrusion of the top of the extrusion chamber 2 by the first jacking rod 3, the opening of the extrusion container 1, the top opening 9 of the extrusion chamber 2, the center of the core outlet mold 6, and the preform outlet 10 on the extrusion container 1 are all located on a same line. This ensures that the fiber preform products prepared by extrusion will not bend. The state when the extrusion of the extrusion chamber 2 by the first jacking rod 3 ends is shown in FIG. 3 in which the reference numeral 11 now presents the part of $TeO_2$—$GeO_2$—$Nb_2O_5$ cladding glass ingot extruded from the preform outlet 10.

Step-7: Maintaining the temperature inside the extrusion container 1 at the preset temperature T, taking the first jacking rod 3 out of the extrusion container 1 and putting the second jacking rod 12 into the extrusion container 1, in such a way that the second jacking end of the second jacking rod 12 runs through the top opening 9 of the extrusion chamber 2 and resists against the extrusion head 4. The state when the extrusion chamber 2 is extruded by the second jacking rod 12 is shown in FIG. 4. The second jacking end of the second jacking rod 12 is preferably resisted against the upper surface of the extrusion head 4, so that the extrusion head 4 fully extrudes the $TeO_2$—$Nb_2O_5$—PbO core glass ingot 5 below the extrusion head.

Step-8: Making the second jacking rod 12 push the extrusion head 4 to press the $TeO_2$—$Nb_2O_5$—PbO core glass inside the extrusion chamber 2, so that the $TeO_2$—$Nb_2O_5$—PbO core glass is extruded out from the core outlets 60 on the core outlet mold 6 located on the bottom of the extrusion container, obtaining a core array having N $TeO_2$—$Nb_2O_5$—PbO cores. The state when the extrusion of the extrusion chamber 2 by the second jacking rod 12 ends is shown in FIG. 5 in which the upper half of the reference numeral 11 now presents initial preform products containing a $TeO_2$—$Nb_2O_5$—PbO core glass array. Then, the core glass in the extrusion chamber 2 and the cladding glass in the extrusion container 1 are co-extruded to form preform having a regular core array. In this embodiment, the extrusion head 4 can be fully resisted against the whole upper surface of the $TeO_2$—$Nb_2O_5$—PbO core glass in the extrusion chamber.

Step-9: Uniformly pressing the core glass in the extrusion chamber 2 and the cladding glass in the extrusion container 1, so that the $TeO_2$—$Nb_2O_5$—PbO core glass and the $TeO_2$—$Nb_2O_5$—PbO cladding glass are co-extruded out from the preform outlet 10 on the extrusion container 1 obtaining an initial product of the fiber preform.

In the Step-9, both the $TeO_2$—$Nb_2O_5$—PbO core glass in the extrusion chamber 2 and the $TeO_2$—$GeO_2$—$Nb_2O_5$ cladding glass in the extrusion container 1 are extruded at a constant speed. Thus, the uniformity of purity of the obtained initial products of the fiber preform and the finally obtained fiber preform products can be improved, and the fracture of the obtained initial products of the fiber preform and the finally obtained fiber preform products due to inconstant speed can be avoided. Therefore, the quality of the prepared fiber preform products is improved.

The application of a stress onto the top of the extrusion chamber 2 by the second jacking rod 12 is also done in a vacuum chamber. That is, the extrusion chamber 2, the extrusion container 1 and the second jacking rod 12 are all put in the vacuum chamber for extrusion. Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

Step-10: Annealing the obtained initial product of the fiber preform at the transition temperature Tg for a preset period of time (here, 4 h), and cooling the initial product of the fiber preform to room temperature, then a fiber preform is obtained.

Figure 7:
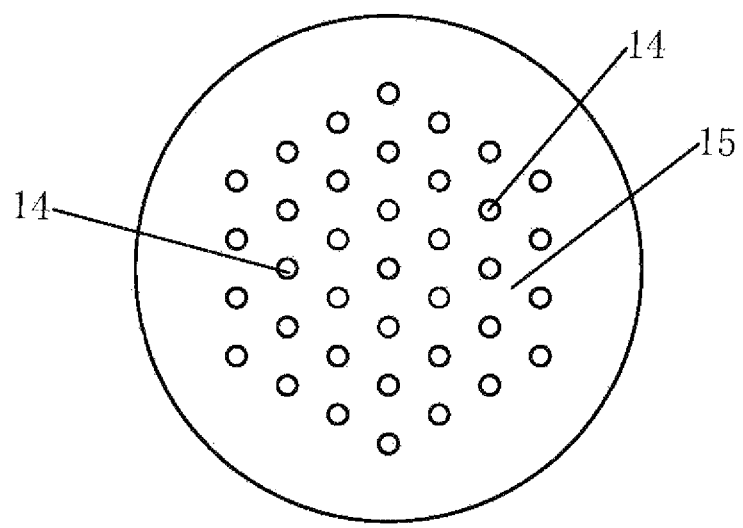
FIG. 7 is a cross-sectional view of fiber preform product prepared by extrusion, according to Embodiment 2 of the present invention.

The cross-section of the fiber preform products prepared in Embodiment 2 is shown in FIG. 7. The reference numeral 14 in FIG. 7 represents the $TeO_2$—$Nb_2O_5$—PbO core glass for the obtained all-solid-state photonic crystal fiber preform products, and the reference numeral 15 represents the $TeO_2$—$GeO_2$—$Nb_2O_5$ cladding glass for the obtained all-solid-state photonic crystal fiber preform products.

It can be found from the product structure shown in FIG. 7 that, in the obtained all-solid-state photonic crystal fiber preform products, the core array of the fiber preform is clear and regular and is closely fitted with the cladding, the core-cladding interface is clear and complete, and the defects on the core-cladding interface, which exist in the preform prepared by the stacking-capillary method, are avoided. Therefore, in this embodiment, the prepared fiber preform are highly precise in size.

Of course, a top plate 16 is disposed in the extrusion chamber 2 covering the core glass ingot 5; and the extrusion head 4 has a plurality of extrusion stems 40 corresponding to each core outlet 60 on the core outlet mold 6 and capable of inserting into the corresponding core outlet 60 after passing through the top plate 16. As shown in FIG. 10 (no $TeO_2$—$Nb_2O_5$—PbO core glass ingot are placed in the extrusion chamber), for each core outlet 60 on the core outlet mold, there is a corresponding extrusion stem corresponding to this core outlet 60. As shown in FIG. 11 ($TeO_2$—$Nb_2O_5$—PbO core glass ingot are placed in the extrusion chamber) and FIG. 12, when the core glass ingot are placed in the extrusion chamber and extruded according to the preparation method described in this embodiment, in the step 8, the extrusion head 4 is pushed by the second jacking rod 12, each extrusion stem 40 on the extrusion head 4 downward extrudes the corresponding core glass ingot below this extrusion stem, and those core glass ingot beside this extrusion stem are not extruded toward the core outlets 60. In this way, the core glass ingot, which are extruded into the core outlets 60 by the extrusion stem, are protected from adverse effect caused by coming into contact with the extrusion chamber or the sidewall of the core outlet mold 6. The adverse effect on this part of extruded core glass by oxygen or other impurities in air during the extrusion out of the core outlets 60 can be avoided. The defects on the core glass surface and the cladding glass surface can be effectively removed, and the purity and quality of the core component in the obtained fiber preform can be improved. With the arrangement of the top plate 16, it is ensured that each extrusion stem can extrude the corresponding core glass ingot independently. This prevents the uprush of the softened core glass ingot toward the upper surface of the core glass ingot when being extruded downward by the extrusion stem. Thus, the quality of the core glass extruded into the corresponding core outlets 60 is improved.

To prepare fiber preform of different requirements, as an improvement to this embodiment, the core glass outlet mold connected to the bottom of the extrusion chamber may be designed to be adjustable according to the actual requirements. That is, by changing the cross-sectional shape of the preform outlet on the preform outlet mold 8, all-solid-state infrared-soft-glass-based photonic crystal fiber preform products having different cross-sectional shapes can be obtained correspondingly.

Embodiment 3

In the Embodiment 3, it is set that the all-solid-state photonic crystal fiber preform to be prepared are fluorozirconate glass based photonic crystal fiber preform, and both the core glass ingot 5 and the cladding glass ingot 7 to be used are fluorozirconate glass ingot. Specifically, the core glass ingot 5 are $Er^{3+}$-dopedZBLAN glass ingot and the cladding glass ingot 7 are non-doped ZBLAN glass ingot. As shown in FIGS. 1-5, the method for preparing fiber preform by extrusion in this embodiment comprises following steps 1-10.

Step-1: An extrusion container 1, an extrusion chamber 2, an extrusion head 4, a core outlet mold 6 (the structure of which may be different from that in Embodiment 1 or Embodiment 2), a preform outlet mold 8 (the structure of which may be different from that in Embodiment 1 or Embodiment 2), a first jacking rod 3 and a second jacking rod 12 are prepared in advance. Wherein the extrusion container 1 has an opening and a preform outlet 10 respectively on the top and the bottom of the extrusion container 1; the extrusion chamber 2 has a top opening 9 and a bottom opening respectively on the top and the bottom of the extrusion chamber 2, and the bottom opening of the extrusion chamber 2 communicates with core outlets 60 on the core outlet mold 6. The size of the top opening 9 of the extrusion chamber 2 is smaller than the diameter of the first jacking end of the first jacking rod 3, to ensure that the first jacking end of the first jacking rod can run into the extrusion chamber 2 from the top opening. The size of the top opening 9 is greater than the diameter of the second jacking end of the second jacking rod 12. Herein, the core outlet mold 6 has N core outlets 60, N≥2. In this embodiment, the top opening of the extrusion chamber 2 is preferably circular, and similarly, the core outlets 60 on the core outlet mold 6 are also preferably circular. The N core outlets 60 in this embodiment are distributed regularly, that is, they form a regular array of core outlets. The core outlet mold 6 is shown in FIG. 9.

The extrusion container, the extrusion chamber, the outlet molds, the first jacking rod, the second jacking rod and the extrusion head, which are prepared in the step 1, are all ultrasonically cleaned and wiped with alcohol before use. Due to the design that the size of the top opening is greater than the diameter of the first jacking end of the first jacking rod, it can be ensured that the first jacking end of the first jacking rod is always located on the outer side of the top of the extrusion chamber when the top of the extrusion chamber is extruded by the first jacking end of the first jacking rod, in order to ensure that the whole extrusion chamber is extruded downward by the first jacking end of the first jacking rod. Correspondingly, due to the design that the size of the top opening of the extrusion chamber is greater than the diameter of the second jacking end of the second jacking rod, it can be ensured that the second jacking end of the second jacking rod can run into the extrusion chamber from the top opening of the extrusion chamber during the subsequent extrusion process, to facilitate the extrusion of the corresponding $Er^{3+}$-doped ZBLAN core glass ingot by the extrusion head. Of course, when the extrusion container, the extrusion chamber, the first jacking rod and the second jacking rod are ultrasonically cleaned and wiped with alcohol, they may be further cleaned with distilled water or deionized water.

Step-2: $Er^{3+}$-doped ZBLAN core glass ingot and non-doped ZBLAN cladding glass ingot which are rinsed with alcohol and dried, wherein the $Er^{3+}$-doped ZBLAN core glass ingot has an outer diameter matched with the inner diameter of the extrusion chamber; and the non-doped ZBLAN cladding glass ingot cladding glass ingot has an outer diameter matched with the inner diameter of the extrusion container.

Additionally, in the Step-2, the $Er^{3+}$-doped ZBLAN core glass ingot and the non-doped ZBLAN cladding glass ingot are all ultrasonically cleaned and wiped with alcohol before used, to remove impurities on the surfaces of the two kinds of fluorozirconate glass ingot, in order to avoid adverse effect on the subsequent preparation of fiber preform by extrusion by those impurities. Of course, when the two kinds of glass ingot are ultrasonically cleaned and wiped with alcohol, they may be further cleaned with distilled water or deionized water.

Here, the expression "the $Er^{3+}$-doped ZBLAN core glass ingot and the non-doped ZBLAN cladding glass ingot have an outer diameter matched with the inner diameter of the extrusion chamber" means that the $Er^{3+}$-doped ZBLAN core glass ingot, as the raw material, can be exactly placed in the extrusion chamber, and the non-doped ZBLAN cladding glass ingot can be closely fitted on the inner sidewall of the extrusion chamber.

Step-3: Placing the non-doped ZBLAN cladding glass ingot inside the bottom of the extrusion container 1, placing the $Er^{3+}$-doped ZBLAN core glass ingot and the extrusion head 4 inside the extrusion chamber 2, and mounting the core outlet mold 6 at the bottom of the extrusion chamber 2, the core outlet mold 6 is located above the non-doped ZBLAN cladding glass ingot and the extrusion head 4 is located above the $Er^{3+}$-doped ZBLAN core glass ingot. The extrusion chamber 2 can protect the $Er^{3+}$-doped ZBLAN core glass ingot, to ensure that the $Er^{3+}$-doped ZBLAN core glass ingot can be wholly extruded into the non-doped ZBLAN cladding glass ingot.

Step-4: Putting the extrusion chamber 2 with the $Er^{3+}$-doped ZBLAN core glass ingot into the extrusion container 1, and resting the first jacking end of the first jacking rod 3 against the top surface of the extrusion chamber, aligning the center of the first jacking end of the first jacking rod 3 with the center of the core outlet mold 6.

Step-5: Heating the extrusion container 1 with the extrusion chamber of the step 4 until the temperature in the extrusion container 1 reaches a preset temperature T, so as to make the $Er^{3+}$-doped ZBLAN core glass ingot and the non-doped ZBLAN cladding glass ingot in the extrusion container 1 soft to obtain softened $Er^{3+}$-doped ZBLAN core glass and non-doped ZBLAN cladding glass.

Wherein the preset temperature T is higher than Tg and lower than Tx; Tg is defined as the highest one of the $Er^{3+}$-doped ZBLAN core glass transition temperature and the non-doped ZBLAN cladding glass transition temperature, and the Tx is defined as the lowest one of the $Er^{3+}$-doped ZBLAN core glass crystallization temperature and the non-doped ZBLAN cladding glass crystallization temperature. For example, according to the $Er^{3+}$-doped ZBLAN core glass ingot and the non-doped ZBLAN cladding glass ingot to be used, the preset temperature T in this embodiment is higher than 185° C. and lower than 370° C. For example, the preset temperature T is 200° C. The state before the extrusion of the extrusion chamber 2 by the first jacking rod 3 starts is shown in FIG. 2.

Step-6: Pressing the first jacking rod 3 against the top of the extrusion chamber 2, and pushing the extrusion chamber 2 into the non-doped ZBLAN cladding glass inside the extrusion container 1, so as to make the bottom of the core outlets 60 of the core outlet mold 6 flush with the bottom of the non-doped ZBLAN cladding glass or make the bottom of the core outlets 60 on the core outlet mold 6 is lower than the bottom of the non-doped ZBLAN cladding glass. The application of the pressing process of the first jacking rod 3 onto the extrusion chamber 2 is in a vacuum chamber. That is, the extrusion chamber 2, the extrusion container 1 and the first jacking rod 3 are all put in the vacuum chamber for extrusion.

Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

During the extrusion of the top of the extrusion chamber 2 by the first jacking rod 3, the opening of the extrusion container 1, the top opening 9 of the extrusion chamber 2, the center of the core outlet mold 6, and the preform outlet 10 on the extrusion container 1 are all located on a same line. This ensures that the fiber preform products prepared by extrusion will not bend. The state when the extrusion of the extrusion chamber 2 by the first jacking rod 3 ends is shown in FIG. 3 in which the reference numeral 11 now presents the part of non-doped ZBLAN cladding glass ingot extruded from the preform outlet 10.

Step-7: Maintaining the temperature inside the extrusion container 1 at the preset temperature T, taking the first jacking rod 3 out of the extrusion container 1 and putting the second jacking rod 12 into the extrusion container 1, in such a way that the second jacking end of the second jacking rod 12 runs through the top opening 9 of the extrusion chamber 2 and resists against the extrusion head 4. The state when the extrusion chamber 2 is extruded by the second jacking rod 12 is shown in FIG. 4. The second jacking end of the second jacking rod 12 is preferably resisted against the upper surface of the extrusion head 4, so that the extrusion head 4 fully extrudes the $Er^{3+}$-doped ZBLAN core glass ingot below the extrusion head.

Step-8: Making the second jacking rod 12 push the extrusion head 4 to press the $Er^{3+}$-doped ZBLAN core glass inside the extrusion chamber 2, so that the $Er^{3+}$-doped ZBLAN core glass is extruded out from the core outlets 60 on the core outlet mold 6 located on the bottom of the extrusion container, obtaining a core array having N $Er^{3+}$-doped ZBLAN cores. The state when the extrusion of the extrusion chamber 2 by the second jacking rod 12 ends is shown in FIG. 5 in which the upper half of the reference numeral 11 now presents initial preform products containing a $Er^{3+}$-doped ZBLAN core glass array. Then, the core glass in the extrusion chamber 2 and the cladding glass in the extrusion container 1 are co-extruded to form preform having a regular core array. In this embodiment, the extrusion head 4 can be fully resisted against the whole upper surface of the $Er^{3+}$-doped ZBLAN core glass in the extrusion chamber.

Step-9: Uniformly pressing the core glass in the extrusion chamber 2 and the cladding glass in the extrusion container 1, so that the $Er^{3+}$-doped ZBLAN core glass and the non-doped ZBLAN cladding glass are co-extruded out from the preform outlet 10 on the extrusion container 1 obtaining an initial product of the fiber preform.

In the Step-9, both the $Er^{3+}$-doped ZBLAN core glass in the extrusion chamber 2 and the non-doped ZBLAN cladding glass in the extrusion container 1 are extruded at a constant speed. Thus, the uniformity of purity of the obtained initial products of the fiber preform and the finally obtained fiber preform products can be improved, and the fracture of the obtained initial products of the fiber preform and the finally obtained fiber preform products due to inconstant speed can be avoided. Therefore, the quality of the prepared fiber preform products is improved.

The application of a stress onto the top of the extrusion chamber 2 by the second jacking rod 12 is also done in a vacuum chamber. That is, the extrusion chamber 2, the extrusion container 1 and the second jacking rod 12 are all put in the vacuum chamber for extrusion. Specifically, the vacuum chamber is vacuumized by a vacuum pump, inert gas is supplemented into the vacuum chamber when the degree of vacuum in the vacuum chamber is lower than $10^{-2}$ Pa, so as to make the pressure in the vacuum chamber same as the atmospheric pressure, for example, the supplemented inert gas is nitrogen.

Step-10: Annealing the obtained initial product of the fiber preform at the transition temperature Tg for a preset period of time (here, 4 h), and cooling the initial product of the fiber preform to room temperature, then a fiber preform is obtained.

Figure 8:
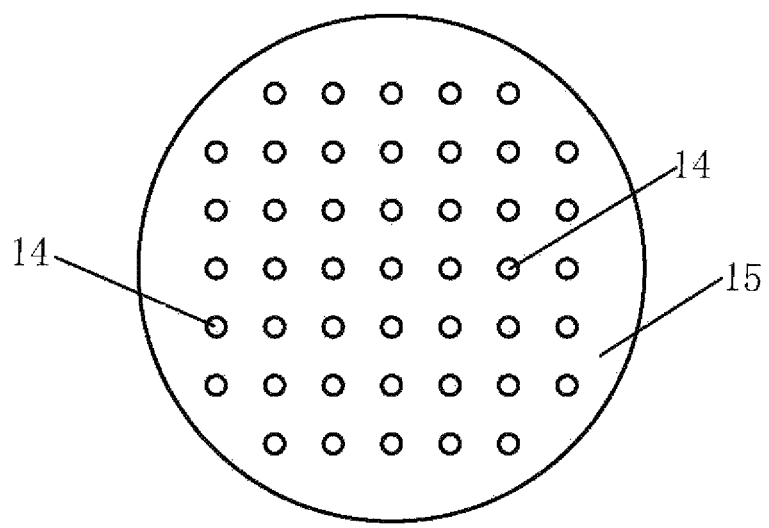
FIG. 8 is a cross-sectional view of fiber preform product prepared by extrusion, according to Embodiment 3 of the present invention.

The cross-section of the fiber preform products prepared in Embodiment 3 is shown in FIG. 8. The reference numeral 14 in FIG. 8 represents the $Er^{3+}$-doped ZBLAN core glass for the obtained all-solid-state photonic crystal fiber preform products, and the reference numeral 15 represents the non-doped ZBLAN cladding glass for the obtained all-solid-state photonic crystal fiber preform products.

It can be found from the product structure shown in FIG. 8 that, in the obtained all-solid-state photonic crystal fiber preform products, the core array of the fiber preform is clear and regular and is closely fitted with the cladding, the core-cladding interface is clear and complete, and the defects on the core-cladding interface, which exist in the preform prepared by the stacking-capillary method, are avoided. Therefore, in this embodiment, the prepared fiber preform are highly precise in size.

Of course, there may be a top plate 16 is disposed in the extrusion chamber 2 covering the core glass ingot 5; and the extrusion head 4 has a plurality of extrusion stems 40 corresponding to each core outlet 60 on the core outlet mold 6 and capable of inserting into the corresponding core outlet 60 after passing through the top plate 16. As shown in FIG. 10 (no $Er^{3+}$-doped ZBLAN core glass ingot are placed in the extrusion chamber), for each core outlet 60 on the core outlet mold, there is a corresponding extrusion stem corresponding to this core outlet 60. As shown in FIG. 11 ($Er^{3+}$-doped ZBLAN core glass ingot are placed in the extrusion chamber) and FIG. 12, when the core glass ingot are placed in the extrusion chamber and extruded according to the preparation method described in this embodiment, in the step 8, the extrusion head 4 is pushed by the second jacking rod 12, each extrusion stem 40 on the extrusion head 4 downward extrudes the corresponding core glass ingot below this extrusion stem, and those core glass ingot beside this extrusion stem are not extruded toward the core outlets 60. In this way, the core glass ingot, which are extruded into the core outlets 60 by the extrusion stem, are protected from adverse effect caused by coming into contact with the extrusion chamber or the sidewall of the core outlet mold 6. The adverse effect on this part of extruded core glass by oxygen or other impurities in air during the extrusion out of the core outlets 60 can be avoided. The defects on the core glass surface and the cladding glass surface can be effectively removed, and the purity and quality of the core component in the obtained fiber preform can be improved. With the arrangement of the top plate 16, it is ensured that each extrusion stem can extrude the corresponding core glass ingot independently. This prevents the uprush of the softened core glass ingot toward the upper surface of the core glass ingot when being extruded downward by the extrusion stem. Thus, the quality of the core glass extruded into the corresponding core outlets 60 is improved.

To prepare fiber preform of different requirements, as an improvement to this embodiment, the core glass outlet mold connected to the bottom of the extrusion chamber may be designed to be adjustable according to the actual requirements. That is, by changing the cross-sectional shape of the preform outlet on the preform outlet mold 8, all-solid-state infrared-soft-glass-based photonic crystal fiber preform products having different cross-sectional shapes can be obtained correspondingly.

It is to be noted that the method for preparing all-solid-state photonic crystal fiber preform by extrusion provided in the present invention can be applied to the preparation of infrared-soft-glass-based photonic crystal fiber preform and also to the preparation of other all-solid-state photonic crystal fiber preform.

Although the preferred embodiments of the present invention have been described above in detail, it should be clearly understood that, for those skilled in the art, various changes and variations of the present invention may be possible. Any modifications, equivalent replacements and improvements made within the spirit and principle of the present invention should fall into the protection scope of the present invention.

What is claimed is:

1. A method for preparing all-solid-state photonic crystal fiber preform by extrusion, comprising:

Step-1: preparing an extrusion container, an extrusion chamber, a core outlet mold, a first jacking rod having a first jacking end, a second jacking rod having a second jacking end, an extrusion head and a fiber preform outlet mold, wherein the extrusion container has an opening and a preform outlet respectively on the top and the bottom of the extrusion container; the extrusion chamber has a top opening and a bottom opening respectively on the top and the bottom of the extrusion chamber; the core outlet mold has a plurality of core outlets; the bottom opening of the extrusion chamber communicates with the plurality of core outlets on the core outlet mold; the size of the top opening of the extrusion chamber is smaller than the diameter of the first jacking end of the first jacking rod, and the size of the top opening is greater than the diameter of the second jacking end of the second jacking rod;

Step-2: preparing a core glass ingot and a cladding glass ingot which are rinsed with alcohol and dried, wherein the core glass ingot has an outer diameter matched with an inner diameter of the extrusion chamber; and the cladding glass ingot has an outer diameter matched with an inner diameter of the extrusion container;

Step-3: placing the cladding glass ingot inside the bottom of the extrusion container, placing the core glass ingot and the extrusion head inside the extrusion chamber, and mounting the core outlet mold at the bottom of the extrusion chamber, the core outlet mold is located above the cladding glass ingot and the extrusion head is located on the core glass ingot;

Step-4: putting the extrusion chamber with the core glass ingot into the extrusion container, and resting the first jacking end of the first jacking rod against the top surface of the extrusion chamber, aligning the center of the first jacking end of the first jacking rod with the center of the core outlet mold;

Step-5: heating the extrusion container with the extrusion chamber of Step-4 until the temperature in the extrusion container reaches a preset temperature T, so as to make the core glass ingot and the cladding glass ingot in the extrusion container soft to obtain softened core glass and cladding glass; wherein the preset temperature T is higher than Tg and lower than Tx; Tg is defined as the highest one of the core glass transition temperature and the cladding glass transition temperature, and Tx is defined as the lowest one of the core glass crystallization temperature and the cladding glass crystallization temperature;

Step-6: pressing the first jacking rod against the top of the extrusion chamber, and pushing the extrusion chamber into the cladding glass inside the extrusion container, so as to make the bottom of the core outlets of the core outlet mold flush with the bottom of the softened cladding glass or make each bottom of the plurality of core outlets of the core outlet mold lower than the bottom of the softened cladding glass;

Step-7: maintaining the temperature inside the extrusion container at the preset temperature T, taking the first jacking rod out of the extrusion container, and putting the second jacking rod into the extrusion container, in such a way that the second jacking end of the second jacking rod runs through the top opening of the extrusion chamber and resists against the extrusion head;

Step-8: making the second jacking rod push the extrusion head to press the softened core glass inside the extrusion chamber, so that the softened core glass is extruded out from the plurality of core outlets on the core outlet mold located on the bottom of the extrusion container, obtaining a core array having N cores, where N is the number of cores extruded from the extrusion container when the second jacking rod pushes on the extrusion head;

Step-9: uniformly pressing the softened core glass in the extrusion chamber and the softened cladding glass in the extrusion container, so that the softened core glass and softened cladding glass are co-extruded out from the preform outlet on the extrusion container, obtaining an initial product of the fiber preform; and Step-10: annealing the obtained initial product of the fiber preform at the transition temperature Tg for a preset period of time, and cooling the initial product of the fiber preform to room temperature, then a fiber preform is obtained, wherein a top plate is disposed in the extrusion chamber covering the core glass ingot; and the extrusion head has a plurality of extrusion stems corresponding to each core outlet on the core outlet mold and capable of inserting into the corresponding core outlet after passing through the top plate.

2. The method of claim 1, wherein the plurality of core outlets on the core outlet mold are separated from each other at a fixed distance.

3. The method of claim 1, wherein the extrusion container, the extrusion chamber, the core outlet mold, the first jacking rod, the second jacking rod, the extrusion head, the core glass ingot and the cladding glass ingot are all ultrasonically cleaned and wiped with alcohol before Step-3.

4. The method of claim 1, wherein the pressing process of the first jacking rod onto the extrusion chamber in Step-6 and the push to press process of the second jacking rod onto the extrusion chamber in Step-8 are done in a vacuum chamber.

5. The method of claim 4, wherein the following step is respectively done before the pressing process of the first jacking rod onto the extrusion chamber in Step-6 and the push to press process of the second jacking rod onto the extrusion chamber to press the core glass in Step-8: the vacuum chamber is vacuumized by a vacuum pump, then inert gas is supplemented into the vacuum chamber once the degree of vacuum in the vacuum chamber is lower than $10^{-2}$ Pa to increase the pressure in the vacuum chamber to atmospheric pressure.

6. The method of claim 1, wherein in Step-9, both the softened core glass in the extrusion chamber and the softened cladding glass in the extrusion container are extruded at a constant speed.

7. The method of claim 1, wherein the preset period of time in Step-10 is between 4 h and 6 h.

8. The method of claim 1, wherein both the core glass ingot and the cladding glass ingot are infrared soft glass ingot, and the difference ΔTg between the transition temperatures for the core glass ingot and the cladding glass ingot is less than or equal to 15° C.

9. The method of claim 1, wherein the opening of the extrusion container, the top opening of the extrusion chamber, the center of the core outlet mold, and the preform outlet on the extrusion container are aligned on a straight line.

* * * * *